United States Patent [19]  
Louis et al.

[11] 3,806,141  
[45] Apr. 23, 1974

[54] TRACTOR, IN PARTICULAR, AGRICULTURAL TRACTOR WITH ATTITUDE CONTROL

[76] Inventors: Jacques Louis Jean-Baptiste Janer, Nationale 98-83380, Les Issambres, France

[22] Filed: Sept. 21, 1972

[21] Appl. No.: 290,929

[30] Foreign Application Priority Data
Sept. 23, 1971  France .............................. 71.35888

[52] U.S. Cl. ............................... 280/6.1, 280/124 F
[51] Int. Cl. ............................................... B60g 17/00
[58] Field of Search .......................... 280/6.1, 124 F

[56] References Cited
UNITED STATES PATENTS
3,183,016   5/1965   Gustafsson ........................... 280/6.1
2,742,298   4/1956   Witzel ................................... 280/6.1

Primary Examiner—Philip Goodman

[57] ABSTRACT

Tractor, in particular, agricultural tractor, with attitude control, characterized in that each of the wheels of the rear drive train is mounted at the end of an arm pivoting about its other extremity on the body of the tractor, the pivoting axis normally being situated in front of the axle of the driving wheel, relative to the tractor.

8 Claims, 10 Drawing Figures

PATENTED APR 23 1974    3,806,141

TRACTOR, IN PARTICULAR, AGRICULTURAL TRACTOR WITH ATTITUDE CONTROL

The present invention concerns tractors, and, in particular but not exclusively, those used for agricultural work such as ploughing, mowing, harrowing, towing collecting vehicles, etc., it may also be applied with advantage to tractors used in the exploitation of forests, for clearance or dragging of tree trunks, for example.

The increase in the use of tractors has revealed the very high frequency of accidents, due to their turning over sideways, usually resulting in serious or even mortal injury of the driver.

In fact, with a view to increasing output, users, utilizing the area, for example, arable, of a field, to the maximum, are led to maneuver their tractor at the extreme limits of the said field, generally bordered by banks or ditches, or even by ground of a swampy character.

The rear driving axle of such tractors being rigid, it follows that during these maneuvers, the driving wheel on the outside of the curve suddenly goes up (bordering bank) or down (ditch); if this repositioning of the driving wheel does not cause the centre of gravity of the tractor to pass above the contact area of one of the driving wheels on the ground, the turn is effected normally, despite the sudden change in attitude of the tractor, which is not without discomfort for the driver.

On the other hand, if the centre of gravity of the tractor passes over the contact area of one of the driving wheels on the ground, the tractor turns over sideways, either towards the inside of the curve if the outside wheel at this curve goes onto a bank, or towards the outside of the curve if the said outside wheel goes down into a ditch or sinks into soft ground.

In addition, it has been remarked that a tractor of the type mentioned above which may be referred to as "standard," although it offers real advantages of economy and ease of maneuver compared with caterpillar tractors, is much more difficult to free than a tractor of the latter type when, for example, it gets stuck in soft ground.

Moreover, it is clear that a high ground clearance is an appreciable advantage looked for in tractors, which has led to the construction of tractors described as "long legged;" in practice this clearance is determined by the lowest point of the transmission, in fact, the gear box-differential unit, which is all the lower as the reduction gearing between motor and wheels requires gear wheels of large dimensions.

The tractor, in particular, the agricultural tractor, with attitude control, object of the invention, is proposed to overcome these disadvantages in a simple and effective way; in addition, it does not necessitate a fundamental change in the design of these machines and can therefore be realized in a particularly economic fashion, particularly in view of the advantages obtained.

According to the invention, each of the wheels of the rear drive train of a tractor is mounted at the end of an arm pivoting on the chassis or the body of the tractor at its other extremity, the spacing of the axes at the ends of the arm being equal to, or smaller or greater than the radius of the driving wheel, and the pivoting axis of the arm on the chassis or the body of the tractor being normally situated in front of the axle of the driving wheel, relative to the tractor.

Still conforming with the invention, each arm comprises means for transmitting the driving power from the pivot axis of the arm to the axle of the driving wheel, for example, gear train, chain and sprockets, angled shaft drive, etc.; these means may advantageously constitute a reduction assembly allowing the dimensions of the gear box and differential of the tractor to be decreased.

According to the methods of realization conforming with the invention, the arms carrying the driving wheels each have their positions determined, either with the aid of a jack, acting directly on the arm or via a bracket integral with the said arm, or alternatively, acting by any appropriate means on the tubular pivot axle of the arm, using a crown wheel intergral with the arm controlled by a pinion or by a worm.

In the first case, the jack is double acting, controlled by an individual valve fed from the hydraulic or hydropneumatic supply of the tractor.

In the second case, it is a mechanical take off, engageable separately, which controls, reversibly, the rotation of the control pinion or worm.

Thus, in each of the preceding cases, the position of the arms carrying the driving wheels can be adjusted separately by means of a corresponding lever or hydraulic valve.

Conforming with the invention, the ground clearance of the tractor, apart from the fact that it may vary, depending on the position of the arms, may be basically taken to the maximum, the lowest point of the body of the tractor being the differential drive output which it will be possible to make of particularly small dimensions on account of the reduction effected subsequently in the transmission elements in each arm.

One of the advantages of the invention is to allow, by a judicious selection of the positions of the arms carrying the driving wheels, the transverse trim of the tractor body to be maintained practically horizontal when traversing steep slopes. Thus, the loss of lateral equilibrium and consequent turning over of the tractor may be avoided. With this device, it will also be possible to operate the tractor along the edge of a field, for example, with one driving wheel running in a bordering ditch, or also, to turn round the tractor at the end of a field flanked by a bank.

According to the particuliarities of the invention, the body of the tractor will be provided with a spade designed to dig into the ground and anchor the tractor when the two arms carrying the driving wheels are raised; in this case, one of the driving wheels will incorporate a drum suitable for use as a winch.

When the tractor, preferably incorporating a mechanical control device for the position of the arms carrying the driving wheels which allows complete turns of the said arms about their pivoting axes, should get stuck in soft ground, it will be possible, either to rest the tractor on its belly, in order to allow the insertion of anti-slip grids under the driving wheels, in the raised position, and subsequently lowered, or alternatively, to swing the centres of the driving wheels over the pivot axis of the arms until the said driving wheels again make contact with the ground, further ahead relative to the body of the tractor, raising the tractor and freeing it, either with the wheels locked by rotating the arms to push the tractor, or with the position of the arms locked, by rotation of the said wheels. According to other peculiarities of the invention, devices may be provided, to lock the arms carrying the driving wheels in given positions (hydraulic or mechanical locking, for example, irreversibility of the worm driving the crown wheel on the arm), and also, by combining the hydraulic control of the arms, for example, with an air chamber, allowing each arm the possibility of an elastic suspension movement for each given position.

Again, still conforming to the invention, it will be possible to maintain the attitude of the tractor automatically, without manual intervention to control the position of the arms, this latter being determined by a gravity operated valve or contact controlling the hydraulic or mechanical means of positioning the arms carrying the driving wheels.

In all cases, it is understood that the front wheels of the tractor will be provided with articulated arrangements, for example, a parallelogram, with jacks, universal joints, etc., allowing them to remain in contact with the ground irrespective of the attitude of the tractor relative to the said ground.

The invention will be better understood on referring to the following description which relates to the schematic drawings appended, giving, as non-limitative examples, the peculiarities and methods of realizing the invention.

Figure 9:
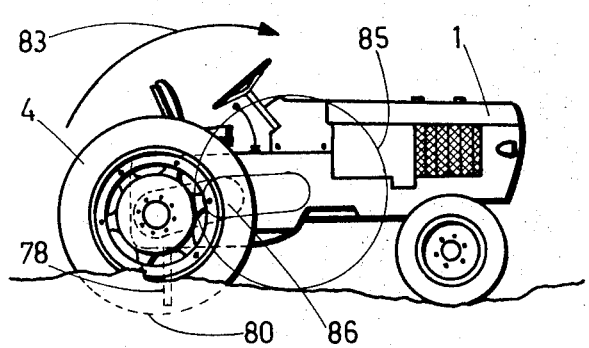

In FIG. 9, the fine lines show the positions which may be adopted by the arms carrying the driving wheels, during an operation to free a wheel that has sunk in.

Figure 10:
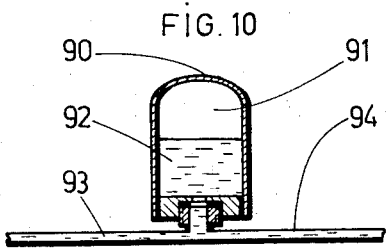

FIG. 10 shows, in section, a hydropneumatic suspension chamber.

Figure 1:
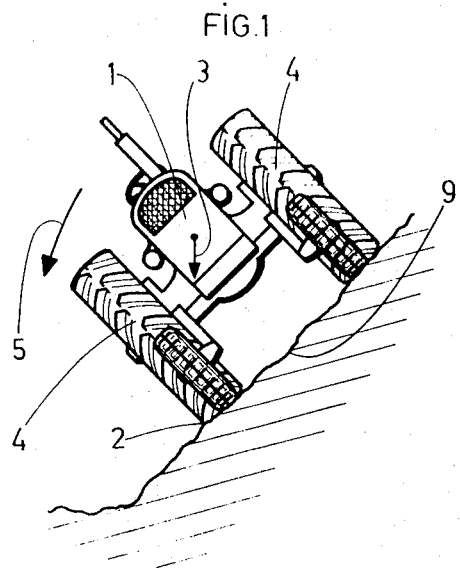
FIG. 1 is a front view of a normal tractor, losing lateral equilibrium.

In FIG. 1, with the tractor running along a bank, its centre of gravity is in such a position that it is over and then goes beyond the point 2 of contact with the ground of one of the driving wheels 4. It is clear that at this moment the tractor 1 turns over sideways as indicated 5, pivoting about the point 2 of contact of the wheel 4; in contrast, running on the same bank 9, FIG. 2, the tractor 1 conforming with the invention remains stable: in fact, the arms 6 pivoting on the body of the tractor 1 at one of their extremities and carrying the driving wheels 4 at their other extremity move in such a way that the centre of gravity 3 of the tractor 1 remains situated between the points of contact 2 and 8 of the driving wheels 4 with the ground, the transverse trim of the tractor remaining essentially horizontal.

In order to allow the front wheels to remain in contact with the ground no matter what the transverse attitude of the tractor, the two front guiding wheels 11 mounted in conventional manner on stub axles 12, are carried on an articulated axle 14. Above this axle, the stub axles 12 prolonged in two bars 13 constitute with the said axle and the axle 15, articulated at the body of the tractor 1 by a pivot 22, a deformable parallelogram.

Figure 3:
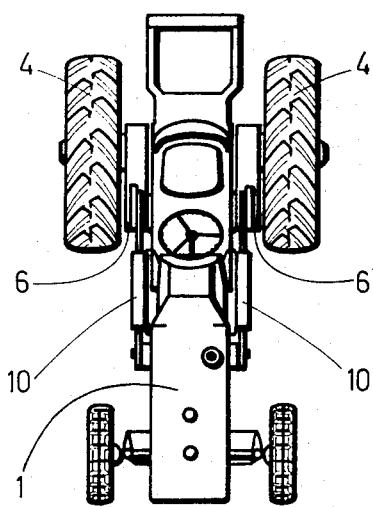
FIG. 3 is a top view of a tractor such as that represented in FIG. 2.
Figure 4:
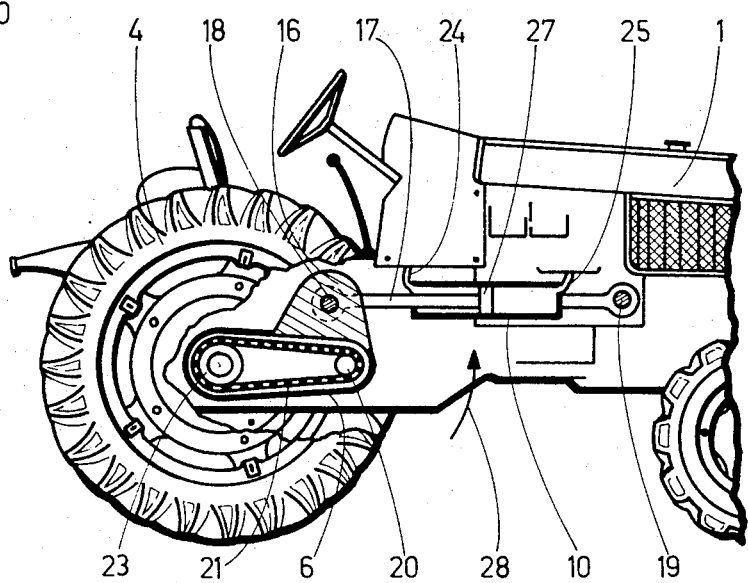
FIG. 4 is a detailed view, partially sectioned, of the arm carrying a driving wheel of a tractor such as that of FIG. 3.

FIG. 3 shows the arrangement on the tractor 1 of the arms 6 which carry the driving wheels 4 and the position of which is controlled by means of double acting hydraulic jacks 10; as is particularly apparent in FIG. 4, the arm 6 carrying the driving wheel 4 forms a case for the drive to this wheel consisting in a sprocket 20 with the same axis of rotation as the pivoting axis of the arm 6 on the body of the tractor 1, of a roller chain 21 and a sprocket 23 integral and concentric with the wheel 4. A bracket 16 is rigidly attached, for example, by welding, to the arm 6 and carries at its extremity an axle accomodating the eye 18 at the end of the rod 17 of the piston of a double acting ram 10 of which the extremity of the cylinder is retained but allowed to pivot on the body of the tractor 1 by a spindle passing through an eye 19. If fluid arrives in the ram 10 via the line 25, the fluid beyond the piston 27 will escape via the line 24 and the arm 6 will turn about its pivoting axis in the sense 28; if the circulation of the fluid occurs in the reverse sense, the displacement of the arm 6 will be controlled in a sense inverse to that of 28 above. Blocking the circulation of the fluid will cause the arm 6 to be locked in a given position.

In order to obtain sufficient useful movement of the arm 6, it is noted that, in practice, its control must be possible through a sector of rotation of the order of 120°, which presents no difficulty with ram control.

Figure 2:
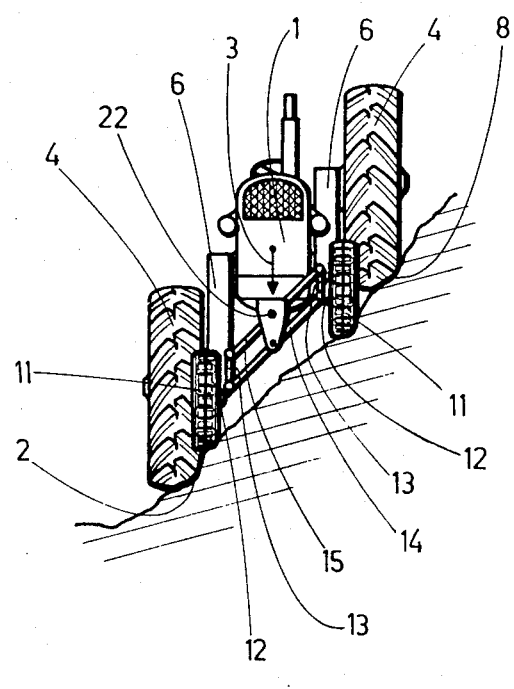
FIG. 2 is a front view of a tractor conforming to the invention, resting on ground of the same configuration as that represented in FIG. 1.
Figure 5:
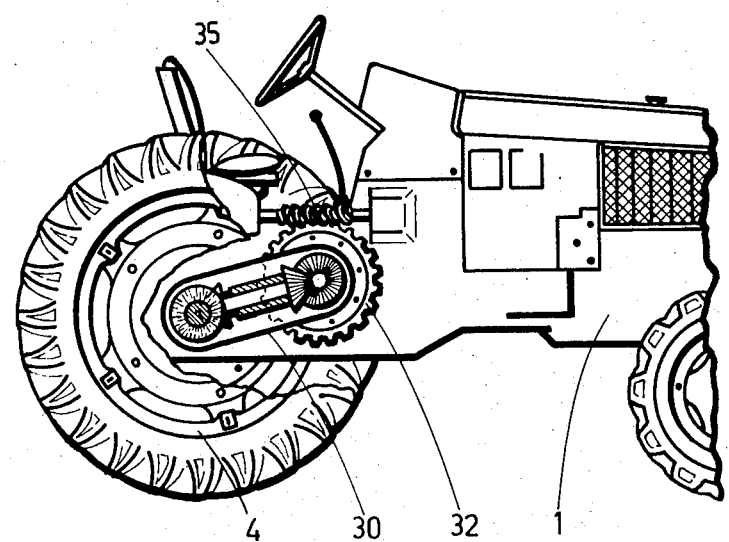
FIG. 5 is a detailed view, partially sectioned, of a variation in construction of the arm, the corresponding driving wheel being removed.
Figure 6:
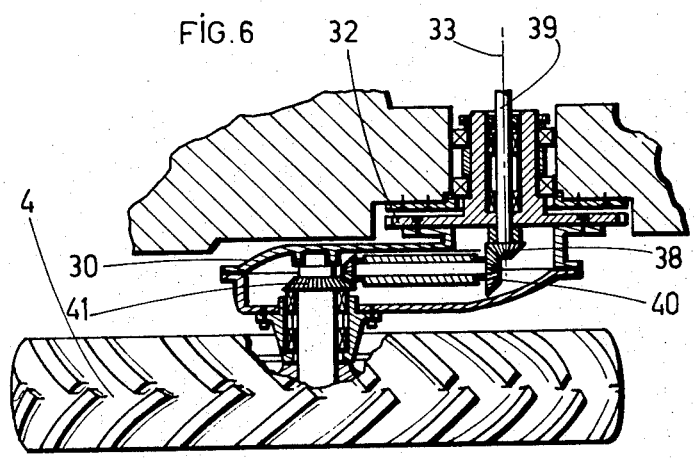
FIG. 6 is a partially sectioned top view of the arm of FIG. 5.

In the method of realization represented in FIGS. 5 and 6, the arm 30, analogous to the arm 6 of the preceding FIGS. 2 and 4, is integral with a crown wheel 32 with the same axis as the pivoting axis 33 of the arm 30 on the body of the tractor 1; the rotation of this crown wheel can be controlled by the rotation of a worm 35 which may be rotated in both senses via a clutch from a power take off not shown on the tractor 1. The drive of the crown wheel by the worm 35 will be chosen irreversible so that the said worm, when stationary, causes the immobilization of the arm 30 in the corresponding position; in such a method of realization, the arm 30 will be able to effect complete revolutions about its axis 33.

The rotation of the driving wheel 4 will be obtained by the bevel gear 38 of the axle 39 of the differential output, which axle 39 coincides with the pivoting axis of the arm 30. A shaft carrying two bevel gears 40 and 41 will allow the wheel 4 to be driven with a reduction.

Figure 7:
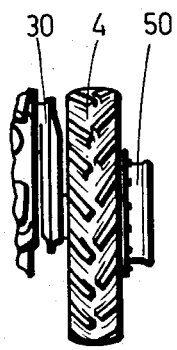
FIG. 7 is a top view of the arm of FIG. 6.

In FIG. 7, the wheel 4, mounted on the arm 30, receives, coaxially, a drum 50 fixed on the rim, not apparent, of the said wheel; this drum may be used as a winch or in the manner of a capstan, for hauling operations, for example, the tractor resting on its belly and the arm 30 blocked in a position such that the wheel 4 is no longer in contact with the ground; the other driving wheel 4 could advantageously remain blocked on the ground. The operation of the winch will be obtained by setting in motion the wheel which carries it.

Figure 8:
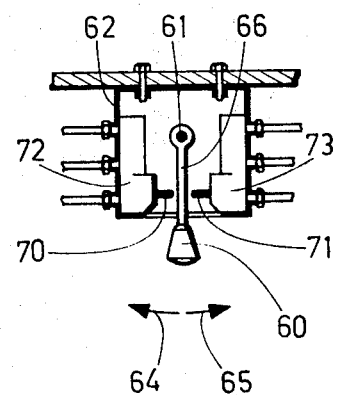
FIG. 8 is a gravity controlled servo valve for controlling the arms.

FIG. 8 shows the layout of a gravity operated servo valve to control the position of the arms carrying the rear driving wheels. The pendulum 60, jointed at 61, in a casing 62, is mounted on the body of the tractor, and swings in the sense 64 or 65 according to the changes in attitude of the said tractor. When it swings, the rod 66 of the pendulum pushes against the button 70 or 71 to control the valves, keeping open the corresponding valve as long as this pressure is maintained, that is, as long as the equilibrium of the tractor is not reestablished; in fact, these valves 72 and 73 control the hydraulic or mechanical position controls of the arms.

In FIG. 9, a tractor 1, bogged down in the initial position of its driving wheels 4, represented in 80, may be freed by rotation of the arms carrying the driving wheels as shown at 83, until the said wheels come to adopt the position 85, in front of the pivot axis 86 of the arms. In this method of realization, the arms will be operated mechanically, for example, of the type represented in FIGS. 5 and 6.

A spade 78, placed under the body of the tractor, will penetrate the ground when the arms are raised as at 83, preventing the tractor from slipping until it is again supported on its driving wheels.

This spade 78 may equally be used to immobilize the body of the tractor when the winch is in use as described above (FIG. 7).

FIG. 10 shows a hydropneumatic chamber which could advantageously be connected in the hydraulic circuit of the double acting rams which position the arms according to, for example, the realizations of FIGS. 2 to 4; in the chamber 90 is trapped a volume of gas 91, immiscible with the fluid 92 in the leads 93 and 94. When the arm carrying the driving wheels is in a given position, the circulation of the fluid being interrupted in the circuit supplying the ram, the arm pushes on the piston of the ram and elastically compresses the gas in the volume 91. Thus, one obtains an elastic suspension of the driving wheels, and therefore, an exceptionally comfortable ride.

One will not go beyond the scope of the invention whatever the materials used for the realization of the organs of the tractor, which may in addition undergo any treatment. In addition, peculiarities of realization may be applied to the device even if not described above, without thereby going beyond the scope of the invention which may be applied to all types of tractors, even not specifically agricultural.

We claim:

1. An agricultural tractor with attitude control, comprising a tractor body having a pair of front steering wheels and a pair of back driving wheels, a parallelogram arrangement of bars supporting said steering wheels extending transversely of said tractor body and pivoted intermediate its ends to said tractor body about a pivot axis disposed in the longitudinal central vertical plane of said tractor body, whereby arrangement can be transversely inclined relative to said tractor body while said steering wheels remain in planes parallel to said central vertical plane of said tractor body, a driving wheel carrying arm on each side of the rear portion of said tractor body, each pivotally connected at one end to said tractor body about a common axis transverse to said tractor body, a large diameter driving wheel journalled in the other end of each arm for rotation about an axis parallel to said common axis, power transmission means connected to said driving wheels and extending through said arms to be drivingly connected to the tractor engine, and manually operated control means for each arm, mounted on said body to adjustably vary the pivoted position of each arm independently of each other about said common axis and to maintain said pivoted position of each arm, whereby said arms can be pivotally adjusted to control the transverse attitude of said tractor body on sloping ground, and to adjust the ground clearance of said tractor body.

2. An agricultural tractor as claimed in claim 1, wherein the distance between said common axis and the driving wheel axes is smaller than the radius of said driving wheels.

3. An agricultural tractor as claimed in claim 1, wherein said tractor includes a power take-off and said manually operated control means include a clutch for each arm connected on one side to said power take-off, a worm gear connected to the other side of said clutch, a crown gear fixed to each arm and concentric with said common axis and meshing with the respective worm gear, whereby selective operations of the clutches will adjustably and independently vary the pivoted position of each arm and can produce a complete revolution of each arm about said common axis.

4. An agricultural tractor as claimed in claim 1, further including a spade carried by said tractor body and disposed between said driving wheels and extending downwardly for ground engagement when said arms are pivoted upwardly to clear said driving wheels from the ground.

5. An agricultural tractor as claimed in claim 1, further including a winch drum secured, and concentric with, one of said driving wheels.

6. An agricultural tractor as claimed in claim 1, wherein said manually operated control means include double-acting hydraulic jacks fed from the hydraulic supply of the tractor and pivotally connected at one end to said tractor body, and at the other end to the respective arms, and hydraulic manually operated valve means in the circuit of said hydraulic jacks to independently and reversibly operate the same.

7. An agricultural tractor as claimed in claim 6, further including additional valve means to control said hydraulic jacks and in turn automatically controlled by means of a device sensitive to gravity, to thereby automatically maintain the transverse attitude of said tractor.

8. An agricultural tractor as claimed in claim 6, further including an air chamber connected in the hydraulic circuit of said hydraulic jacks, allowing some elasticity to be given to the pivoted position of said arms.

* * * * *